United States Patent [19]
Reinhard

[11] 3,789,853
[45] Feb. 5, 1974

[54] RADIANT ENERGY HEATING SYSTEM FOR TEMPERATURE CONTROL OF LIVING SUBJECTS

[76] Inventor: Clyde Reinhard, 220½ Reposado, La Habra Heights, Calif. 90631

[22] Filed: May 22, 1972

[21] Appl. No.: 255,684

[52] U.S. Cl.................. 128/399, 128/1 B, 128/2 H
[51] Int. Cl. ............................................... A61f 7/00
[58] Field of Search.................... 128/371–373, 376, 128/395, 396, 399, 1 B, 2 H

[56] References Cited
UNITED STATES PATENTS

| | | | |
|---|---|---|---|
| 3,698,397 | 10/1972 | Franzel................................. | 128/1 B |
| 2,884,926 | 5/1959 | Grasso ................................. | 128/395 |
| 2,075,696 | 3/1937 | Boerstler............................... | 128/396 |
| 3,338,233 | 8/1967 | Grosholz et al...................... | 128/1 B |
| 3,667,476 | 6/1972 | Muller ................................. | 128/399 |

*Primary Examiner*—Lawrence W. Trapp

[57] ABSTRACT

A temperature sensor attached to a living subject and is connected to a control circuit having an input for connection to a source of alternating current power and an output from which half-waves of the alternating current power are generated when the temperature of the sensor falls below a first temperature and full-waves of the alternating current power are generated when the sensor falls below a second temperature. The output of the control circuit is connected to a plurality of pre-focussed incadescent lamps with infrared filters, the lamps directing infrared radiant energy to a region of controlled temperature within which the temperature sensor and living subject are located.

10 Claims, 3 Drawing Figures

PATENTED FEB 5 1974

RADIANT ENERGY HEATING SYSTEM FOR TEMPERATURE CONTROL OF LIVING SUBJECTS

The present invention relates to the temperature control system and more particularly to radiant energy heating systems for controlling the temperature of living subjects.

In the field of temperature control of living subjects, it has been a general practice to employ heaters which change the temperature of the air surrounding the living subject to perform the temperature control function. Although such devices have served the purpose, they have not proved entirely satisfactory under all conditions of service for the reason that considerable difficulty has been experienced in changing the temperature of the living subject rapidly and in the low efficiency which results by heating the air surrounding the living subject.

In the field of temperature control of living subjects, it has been the general practice to employ "on-off" switching devices to control the heat being applied. These devices have not proven entirely satisfactory under all conditions of service for the reason that considerable difficulty has been experienced in control of the temperature of the living subject within a narrow interval and in rapidly bringing the temperature to a predetermined set point when the system is first turned on. Although proportional control systems can control temperature to a more precise valve than can "on-off" systems, the cost is prohibitive.

Those concerned with the development of temperature control systems for living subjects and especially for hospital incubators and baby or infant warmers have long recognized the need for a system which does not require the living subject to be enclosed, can rapidly change the temperature of the living subject to a desired set point, uses readily available parts and is of low cost. In addition, the need has been recognized for heating only the living subject and not the surrounding environment. The present invention fulfills these needs.

Another critical problem concerning designers of living subject and patient warming systems is the contribution of the heating system to the ambiant room temperature thereby raising room temperatures and overloading air conditioning systems. This problem is overcome by the present invention.

A further problem confronting designers of temperature control systems for infants has been the need for enclosures in which to confine the infant and its temperature controlled environment. Consequently, it was necessary to remove the infant from this heat maintaining environment for the processes of bathing, resuscitation, further identification, umbilical catheterization, X-rays, transfusions and other required treatments. All of these procedures can be performed conveniently and safely without removing the infant from the present radiant energy heating system invention.

In treating burn patients, it has been the general practice to employ tent-like enclosures to confine an environment of warmed air for the purpose of maintaining the patient's temperature. Although such enclosures have served the purpose, they have not proved entirely satisfactory under all conditions of service for the reason that the patient is not readily accessible through enclosure and the patient is intimidated by a large canopy or massive hood. The present invention overcomes this difficulty.

Still another critical problem confronting designers of heating systems for living subject has been the unwieldly size and bulk of the apparatus required to perform the temperature control. This problem is overcome by the present invention.

Those concerned with the development of temperature control of medical patients have long recognized the need to prevent those medical personnel administering treatment to the patient from being subjected to an uncomfortable and misdirected heated environment. The present invention fulfills this need.

Medical journals for years have stressed the significance of establishing and maintaining the core or central body temperature of all newborn infants. Radiant heat losses of the newborn are significant due to the large surface area to body weight ratio. These already significant losses are compounded during the first few minutes of life by evaporative cooling which occurs as the wet infant dries. As a result, glucose and oxygen consumption increase rapidly with the falling temperatures. The prior art devices have utilized heating systems which heat the air environment surrounding the infant and therefore the air must be moved across the infant's body in order to impart warmth to the infant by convection heating. This process of temperature control is slow and has a tendency to cool the infant by evaporation thereby counteracting the heating effect of the air temperature.

Those concerned with the development of temperature control of newborn infants have long recognized the need for warming the infant in depth without substantially raising the skin temperature. The present invention fulfills this need.

The general purpose of this invention is to provide a radiant energy heating system for living subject which embraces all the advantages of similarly employed infant and patient temperature control units and possesses none of the aforedescribed disadvantages. To attain this, the present invention contemplates a unique arrangement of a focussed infrared radiant energy heater, a dual-power level control circuit and a temperature sensor applied to a living subject whereby radiant energy is directed only to the living subject for its temperature control.

An object of the present invention is the provision of warming a living subject without a surrounding enclosure.

Another object is to provide warming of living subjects without an enclosure and without heating the environment surrounding the subject or heating attending personnel.

A further object of the invention is the provision of warming of living subjects in depth with focussed and penetrating infrared radiant energy directed only to the living subject.

Still another object is to provide high level radiant energy for rapid warming of living subjects and low level radiant energy for maintaining an established temperature.

Yet another object of the present invention is the provision of warming of living subjects with focussed dual-level infrared radiant energy controlled by the temperature at the surface of the living subject.

A still further object of the warming of living subjects with focussed dual-level infrared radiant energy with audio and visual alarms for indicating the departure of the temperature of the living subject from a pre-set temperature interval.

Other objects and many of the intended advantages of this invention will be readily appreciated as the same becomes better understood by reference to the following detailed description when considered in connection with the accompanied drawings in which like reference numerals designate like parts throughout the figures thereof and wherein.

Figure 1:
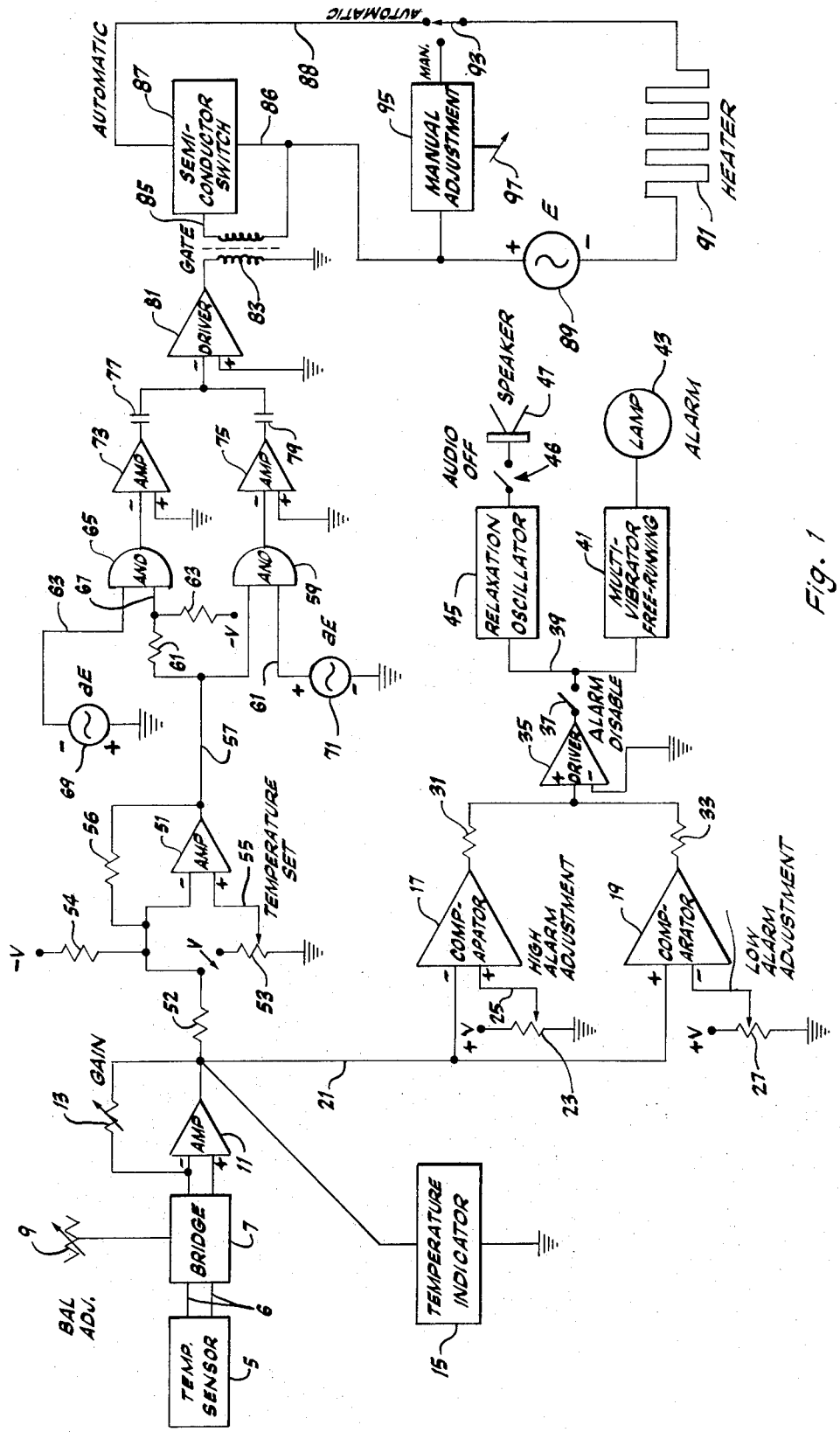
FIG. 1 illustrates a block schematic drawing of an electronic power control circuit for supplying controlled power to infrared heaters.

Turning now to FIG. 1, temperature sensor 5, which may be a thermistor probe or a similar device having electrical characteristics which change with temperature, is connected by conducting cable 6 to bridge 7. Bridge 7 may be a Wheatstone bridge or a similar circuit wherein the electrical characteristics of temperature sensor 5 are converted to an electrical signal. Bridge 7 has a balance adjustment 9 connected thereto and has a pair of output leads connected to amplifier 11. Amplifier 11 may be of the operational amplifier type well known in the electronic instrumentation field, having an inverting input indicated by the terminal designed by the plus sign and a non-inverting input designated by the terminal having the minus sign. Gain of amplifier 11 is adjusted by variable resistor 13 connected between the inverting input and the output of amplifier 11. Temperature indicator 15 is connected between the output of amplifier 11 and circuit ground. Comparator 17 has an inverting input connected to the output of amplifier 11 by line 21 and similarly comparator 19 has a non-inverting input connected to the output of amplifier 11 by line 21. Comparators 17 and 19 may be operational amplifiers or similar circuits having high gain characteristics. The non-inverting input of comparator 17 is connected to the adjustable arm 25 of potentiometer 23 which is in turn connected between a source of potential +V and circuit ground. Similarly the inverting input of comparator 19 is connected to adjustable arm 29 of potentiometer 27 which in turn is connected between a source of potential +V and circuit ground. Potentiometer 23 is further identified as the temperature "high alarm" adjustment and similarly potentiometer 27 is further identified as the temperature "low alarm" adjustment. The output of comparator 17 is connected through resistor 31 to the inverting input of driver 35. Driver 35 may be an operational amplifier having non-inverting input connected to circuit ground. Comparator 19 has its output connected through resistor 33 to the inverting input of driver 35. The output of driver 35 is connected through switch 37 to line 39 which in turn is connected to a relaxation oscillator 45 and a free-running multivibrator 41. The relaxation oscillator is in turn connected to switch 46 also identified as "audio-off" which in turn is connected to speaker 47. Multivibrator 41 is connected to lamp 43 which is also designated as "alarm".

The output of amplifier 11 is further connected to the inverting input of amplifier 51 which may be an operational amplifier havings its non-inverting input connected to the adjustable arm 55 of potentiometer 53 which in turn is connected between a source of potential +V and circuit ground. The output of amplifier 51 is connected by line 57 to one input of "AND" gate 59 which input is also connected to one end of resistor 61. The other end of resistor 61 is connected to one input 67 of "AND" gate 65, input 67 being further connected to one end or resistor 63. The other end of resistor 63 is connected to a source of potential −V. The other input 61 of gate 59 is connected to the plus terminal of alternating polarity voltage source 71 having an alternating voltage of magnitude $aE$. The negative terminal of alternating voltage source 71 is connected to circuit ground. Similarly the other input 63 of gate 65 is connected to the negative terminal of alternating polarity voltage source 69 having an alternating voltage of magnitude aE. Sources 69 and 71 are of the same alternating frequency. The plus terminal of alternating voltage source 69 is connected to circuit ground. The plus and minus signs associated with the alternating voltage sources 69 and 71 are used to indicate an opposite phase relation.

The output of gate 59 is connected to amplifier 75 which may be an operational amplifier havings its non-inverting input connected to circuit ground. Similarly gate 65 has its output connected to the inverting input of amplifier 73 which may be an operational amplifier havings its non-inverting input connected to circuit ground. The outputs of amplifiers 73 and 75 are connected through capacitors 77 and 79 respectively to the inverting input of driver 81. Driver 81 may also be an operational amplifier havings its non-inverting input connected to circuit ground. The output of driver 81 is connected to the primary winding of transforming 83, the other end of the primary winding being connected to circuit ground. The secondary winding of transformer 83 is connected between gate terminal 85 and terminal 86 of semiconductor switch 87. Semiconductor switch 87 may be a triac or a similar type switch which can conduct unidirectional or bidirectional depending upon the characteristics of the gate signal applied thereto. Terminal 88 of semiconductor switch 87 is connected to one terminal of single-pole-double-throw switch 93. The other terminal of switch 93 is connected to manual adjustment 95 which in turn is connected to terminal 86 of semiconductor switch 87. Manual adjustment 95 has manual control means 97 connected thereto. Manual adjustment 95 may be a variable power resistor or variac or any other control device of the type which can control power delivered to an electrical device connected in series therewith. The pole of switch 93 is connected to heater 91 which in turn is connected to one side of source 89 of alternating current power having a voltage magnitude E. The other side of source 89 is connected to terminal 86 of semiconductor switch 87. Heater 91 can be a plurality of series connected pre-focussed lamps with infrared filters.

Figure 2:
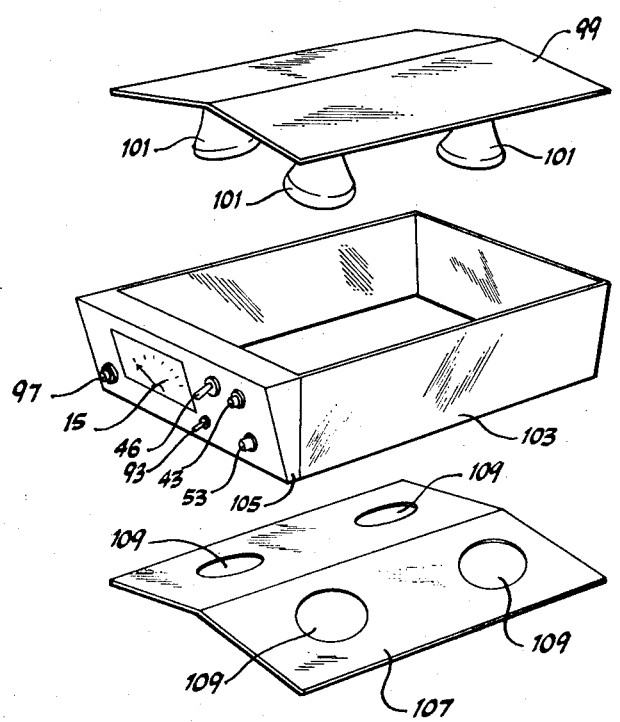
FIG. 2 illustrates a mechanical pictorial exploded view of the infrared heaters and control panel portion of the present invention.

Referring now to FIG. 2, panel 99 has mounted thereon, pre-focussed incandescent lightbulbs or lamps 101. Although only three lamps are visible in FIG. 2, there are four lamps altogether with two lamps mounted on one side of panel 99 and two lamps on the other. Panel 99 is bent in such a manner that when the lamps are mounted thereon, the energy radiated from the lamps on one side is directed substantially to the same region as the energy radiated from the lamps on the other side. Panel 99 forms the top of enclosure 103. The front of enclosure 103 contains electronic control unit 105 upon which is located temperature indicator 15, manual control 97, "automatic-manual" switch 93, "audio-off" switch 46, "alarm" lamp 43 and temperature set control potentiometer 53. Panel 107 is attached to the bottom of enclosure 103 thereto and has openings in which infrared filters 109 are located. Filters 109 and the openings therefore are juxtaposed lamps 101 to selectively pass the infrared radiation therefrom. Electronic Control unit 105 contains the electronic circuit of FIG. 1.

Figure 3:
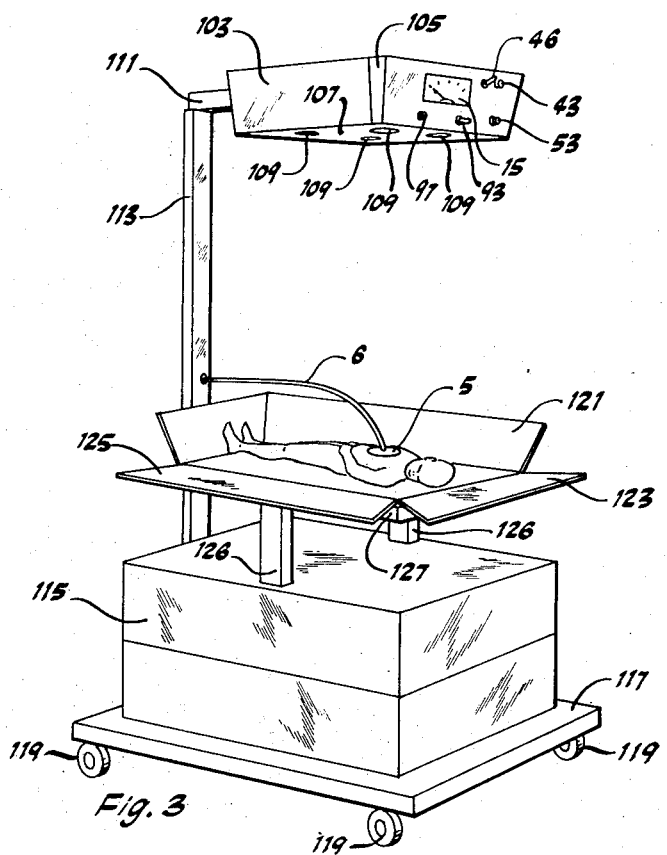
FIG. 3 illustrates a pictorial view of a preferred physical embodiment of the present invention.

Directing the discussion now to FIG. 3, the entire heating system is illustrated. Enclosure 103 with control unit 105 is illustrated with panel 107 in place along with infrared filters 109. Enclosure 103 is attached to adjustable cantilever arm 111 which in turn is attached to supporting post 113. Supporting post 113 is ocnnected to base cabinet 115 which, in turn, is supported by platform 117 having wheels 119 attached to the corners thereof. Cabinet 115 has attached to its topmost surface support members 126. Platform 127 is attached to support members 126 and has basinet 121 affixed thereto having folding walls 123 and 125. Temperature sensor 5 is shown attached to a living subject havings its electrical conducting cable 6 passing therefrom and into the support member 113 through which the cable runs and ultimately is connected to electronic control unit 105.

The operation of the radiant energy heating system for living subjects can best be described by reference by FIG. 1. Assuming bridge 7 is a Wheatstone bridge biased from a source of positive potential with respect to circuit ground, both outputs of the bridge connected to amplifier 11 will have a positive potential, and depending on the temperature, a slightly different potential with respect to ground. At some first preselected temperature, such as 34°C for a particular practical embodiment of the present invention, bridge 7 may be balanced by balance adjustment 9 such that the difference in potential between the output leads of the bridge connected to amplifier 11 is substantially zero. At this balance point no current flows through variable resistor 13 and the output potential of amplifier 11 is substantially the same potential as the input leads thereto. As the temperature of the sensor 5 drops below the preset balance temperature, a current flows from the bridge through variable resistor 13 resulting in the lowering of the output potential of amplifier 11 from that potential established at balance.

When there is no power being delivered to heater 91, the output of amplifier 51 is substantially at or below ground potential. Since the non-inverting input of amplifier 51 is connected to a slightly positive potential at the adjustable arm of potentiometer 53, there is normally a current flowing through resistor 56 from the inverting input of amplifier 51 to the output of amplifier 51 in order to produce a potential drop from the inverting input to the output of the amplifier. Therefore, the potential at the output of amplifier 11 will assume a value such that the current which flows through resistor 52 is of such a magnitude so as to supply the current required by both resistor 54 and resistor 56. Resistor 54 is connected to a source of negative potential −V to provide a current sink for the current which flows through resistor 52 when bridge 7 is at balance and adjustable arm 55 of potentiometer 53 is in the middle of its range.

When the temperature of sensor 5 drops below the temperature at bridge balance, the current which flows through adjustable resistor 13 reduces the output potential of amplifier 11 causing the output potential of amplifier 51 at line 57 to increase and become positive with respect to circuit ground. When the potential on line 57 become positive, one input to gate 59 is activated. When alternating voltage source 71 becomes positive with respect to circuit ground, gate 59 opens and produces a positive input to amplifier 75 causing the output of amplifier 75 to go negative. Amplifier 75 is a high gain amplifier and acts much like a comparator going rapidly into negative overload in the manner of a negative step function, the leading edge of which is coupled through capacitor 79 to driver 81. The value of capacitor 79 is chosen such that it charges very rapidly to transmit only the rapid voltage changes which take place at the output of amplifier 75. Driver 81 is designed to accept only negative pulses at its input converting them to positive output pulses.

As the voltage on line 57 becomes more positive, indicating that the temperature of sensor 5 has dropped further from the pre-set balance temperature to a second pre-selected temperature, the input to gate 65 from line 57 becomes positive as the potential on line 57 overcomes the negative bias set by resistor dividers 61 and 63. Alternating potential 69 will then cause a positive output from gate 65 when alternating voltage 69 becomes positive and the output of amplifier 73 will in turn go negative in the manner of a negative step-function similar to amplifier 75. Capacitor 77 couples the leading edge of the negative step to driver 81, producing a positive output pulse to the primary of transformer 83.

Since alternating sources 69 and 71 are 180° out of phase, gates 65 and 59 will alternately produce a positive output at the beginning of every half cycle of the alternating voltage sources, under the conditions of a large temperature drop. For example, when alternating source 71 is positive, alternating source 69 is negative, therefore gate 59 has a positive output and gate 65 is closed and has no-output. As alternating source 71 goes negative, gate 59 goes to a closed or no-output condition and the output of gate 65 becomes positive as alternating source 69 becomes positive in value. Consequently, a negative pulse is coupled to driver 81 at the beginning of every half cycle of the alternating source 69 and 71. If there is only a small temperature drop and the voltage potential at line 57 is only sufficient to cause gate 59 to be conducting or open and not sufficient to open gate 65, then a negative pulse appears at the input to driver 81 only once every cycle of the alternating wave form of source 71 and not every half cycle as before.

Consequently, a two-level control system is established; one level which produces a controlled pulse to the primary transformer 83 once every cycle of alternating source 72 and a second control point where the voltage of line 57 reaches a higher positive potential allowing alternating source 69 to operate gate 65 thereby causing an additional pulse to be coupled to the primary transformer 83 to produce pulses on every half cycle of the alternating wave form of sources 69 and 71. Therefore, if the temperature drop of sensor 5 is sufficient to cause only gate 59 to be opened, only one pulse at the beginning of each cycle is produced thereby operating switch 87 on one-half of a cycle and causing only one-half of the wave form of alternating power source 89 to be connected to heater 91 to provide half-wave power. However, if the temperature of sensor 5 drops further, to cause both gates 59 and 65 to be opened, a pulse will be provided to semiconductor switch 87 at the beginning each half cycle of alternating power source 89 such that full-wave power is provided to heater 91 and every half cycle of alternating source 89 is coupled through switch 87 to heater 91.

In a preferred embodiment of the present invention, alternating power source 89 and alternating sources 69 and 71 are the same frequency, i.e., 60 Hertz.

The result of the above operation is as follows: If the temperature of the subject being warmed drops a small amount below the set-point temperature, only half power is applied to heater 91 to bring the subject up to temperature. Should there be a large drop in temperature, full power is applied to heater 91 to bring the subject rapidly up to the set-point temperature. A typical magnitude for a drop in temperature which will produce full power to heater 91 is about 0.4°C lower than the set-point temperature.

Turning now to the alarm portion of FIG. 1, the output of amplifier 11 is compared with pre-set voltages for determining high temperature and low temperature alarms. The adjustable arm 25 of potentiometer 23 is set to a voltage equal to the desired high limit, for example, 38°C, and the adjustable arm 29 of potentiometer 27 is set for a low limit, for example, 34°C. When the temperature of sensor 5 is at the set-point temperature, the voltage on line 21 connected to comparators 17 and 19 is a positive potential. Therefore, the potential at adjustable arm 29 at potentiometer 27 would be a positive potential less than the positive potential on line 21 equivalent to the set-point temperature and the potential on adjustable arm 25 of potentiometer 23 would be a positive potential which is greater than the positive potential on line 21 at the set-point temperature. When the temperature of sensor 5 drops below the low limit, the voltage on line 21 drops below the potential on arm 29 causing the output of comparator 19 to become negative. The output of comparator 19 going negative causes the output of driver 35 to become positive which enables relaxation oscillator 45 and free running multivibrator 41 through "alarm disable" switch 37. These, in turn, activate speaker 47 and "alarm" lamp 43. Free running multivibrator 41 causes "alarm" lamp 43 to flash "on" and "off" so as to provide a noticeable visual alarm. Switch 46 may be opened to disconnect speaker 47 from relaxation oscillator 45 and thereby interrupt the audio tone to speaker 47 from oscillator 45.

If the voltage on line 21 exceeds the high alarm voltage on adjustable arm 25 the output of comparator 17 becomes negative causing the output of driver 35 to become positive thereby producing the same alarm response as discussed in connection with comparator 19 when the voltage dropped below the low alarm level.

When the voltage on line 21 has a value between the high level alarm set voltage and the low level alarm set voltage, the outputs of comparators 17 and 19 are positive, making the output of driver 35 negative or substantially at circuit ground thereby disabling relaxation oscillator 45 and multivibrator 41. As a consequence, alarm lamp 43 and speaker 47 are not activated.

Turning now to FIG. 2, prefocussed lamps 101 are utilized as heater 91 illustrated in FIG. 1. Lamps 101 are turned on at half-wave power or full-wave power as discussed in connection with FIG. 1 and their radiation is passed through infrared filters 109 to eliminate the visible radiation and to pass the heating infrared radiation. Panel 107 conducts the heat away from infrared filter 109 so that the temperature of the filters is maintained at a level which will not burn or harm operating personnel using the heating system if they should accidentally come in contact with the filters.

The entire heating system is illustrated in FIG. 3. Temperature sensor 5 is attached to a living subject and is connected to control unit 105 which contains the electronics as illustrated in FIG. 1. On the front of controlling unit 105 is located temperature set-point potentiometer control knob 53 and manual power control knob 97. Switch 93 allows either automatic or manual control of power to be applied to lamps 101. "Audio-off" or disable switch 46 enables the operator to disconnect the speaker from the relaxation oscillator audio tone. "Alarm" lamp 43 is located on the control unit along with temperature indicator 15 so that an alarm condition is clearly visible and the operator can read the temperature of sensor 5. The entire heating unit is adjustably located on post 113 and can be raised or lowered to vary the area which is heated to suit the needs of the application. Platform 127 can be tilted with respect to support members 126 to position the subject as desired. Therefore, radiant energy issuing through filters 109 from prefocussed lamps 101 is directed downward onto the living subject whereby the living subject is warmed. Since the energy is focussed, very little energy is directed to areas other than the subject area resulting in a high efficiency of heating. Since the subject is heated by radiant energy, the environmental area surrounding the subject is not heated and there is no discomfort to the operators in the vicinity.

It now should be apparent that the present invention provides a heating system arrangement which may be employed in conjunction with heating living subjects by directing focussed infrared radiant energy onto the living subject and controlling the intensity of the energy by means of a bi-level power and temperature control circuit.

Although particular components, etc., have been discussed in connection with a specific embodiment of a heating system constructed in accordance with the teachings of the present invention, others may be utilized. Furthermore, it will be understood that although an exemplary embodiment of the present invention has been disclosed and discussed, other applications of circuit arrangement are possible and that the embodiments disclosed may be subjected to various changes, modifications and substitutions without necessarily departing from the spirit of the invention.

What is claimed is:

1. A radiant energy heating apparatus for controlling the temperature of living subject comprising:
temperature sensing means for sensing the temperature of a living subject;
control means connected to said temperature sensing means, said control means having an input for connection to a source of alternating current power and an output from which said control means generates half-waves of said alternating current power when the temperature of said sensing means falls below a first temperature and full-waves of said alternating current power when the temperature falls below a second temperature, said second temperature being less then said first temperature, said control means having no output when the temperature of said sensing means is greater than said first temperature; and radiant energy heater means connected to said output of said control means for directing radiant heat to the living subject, said heater means being responsive to said half-waves and full-waves of said alternating current power and to the absence of any power to generate half-power radiant energy, full-power radiant energy and no radiant energy, respectively.

2. The radiant energy heating apparatus described in claim 1 wherein said radiant energy heater comprises:

a plurality of pre-focussed incandescent lamps arranged to direct substantially all of the radiant energy issuing therefrom into a region occupied by the living subject; and
a plurality of infrared filters juxtaposed said lamps and substantially transmitting only the infrared radiant energy issuing from said lamps.

3. The radiant energy heating apparatus described in claim 2 further including an enclosure for said lamps, said enclosure having a panel with a plurality of openings over which said infrared filters are attached, the heat absorbed by said filters being conducted to said panel whereby the surface temperature of said filters is maintained at a level safe to the touch of an operator of the apparatus.

4. The radiant heating apparatus of claim 3 wherein said control means comprises:

means for generating a direct current signal connected to said temperature sensing means said signal having a magnitude proportional to the temperature of said sensing means;
amplifying means having a first and second input and an output, said first input being connected to said means for generating a direct current signal;
an adjustable direct current reference potential connected to said second input of said amplifying means for setting said first and said second temperatures;
first gate means having two inputs and an output, one input being connected to said amplifying means output and the other input being adapted to receive a signal of alternating polarity in synchronism with said alternating current power, said first gate means generating a control signal at said output only when the output of said amplifying means exceeds a first voltage and the alternating signal is of a first polarity;
a second gate means having two inputs and an output, one input being connected to said amplifying means output and the other input being adapted to receive a signal of alternating polarity in synchronism with the alternating signal applied to said first gate means, said second gate means generating a control signal at said output only when the alternating signal applied to said first gate means is of a second polarity and said amplifying means output exceeds a second voltage, said first voltage being proportional to said first temperature and said second voltage being proportional to said second temperature; and
switch means connected to said first and second gate means, said switch means connecting said half-waves of said alternating current power to said radiant energy heater when said first gate control signal is generated and said full-waves of said alternating current power when both said first and second gate control signals are generated, said switch means disconnecting said alternating current power from said radiant energy heater when both of said control signals are absent.

5. The radiant energy heater apparatus described in claim 4 wherein said control means further includes a temperature indicator connected to said amplifier means output for displaying the temperature of the living subject.

6. The radiant energy heating apparatus described in claim 5 wherein said control means further comprises:

a first adjustable reference potential;
first comparing means connected to said amplifying means output and said first adjustable reference potential for comparing said amplifier means output voltage with said first reference potential, said first comparing means having an output at which is generated an output signal when said amplifying means output exceeds said first reference potential;

a second adjustable reference potential;
second comparing means connected to the said amplifying means output and said second adjustable reference potential for comparing said amplifier means output voltage with said second reference potential, said second comparing means having an output at which is generated an output signal when said amplifier means output voltage falls below said second reference potential, said second reference potential having a magnitude less than said first reference potential;
driver means connected to each of said outputs of said first and second comparing means and having an output at which a driving potential is generated only when either of the output signals from said first and second comparing means is generated; and
audio and visual alarm means connected to said driver means output, said alarm means being activated when said driving potential is generated thereby producing a warning indication when the temperature of said temperature sensing means falls outside a temperature interval determined by said first and second adjustable reference potentials.

7. The radiant energy heating apparatus described in claim 6 wherein said means for generating a direct current signal proportional to the temperature of said temperature sensor includes a bridge circuit into which said temperature sensor is connected said bridge circuit having an output at which a voltage is generated proportional to the difference between the actual temperature of said sensor and the temperature of said sensor when said bridge is balanced, said bridge having means for adjusting the balance temperature.

8. The radiant energy heating apparatus described in claim 7 wherein said switch means further includes:
first and second amplifiers having inputs connected to the outputs of said first and second gates, respectively;
first and second capacitors being connected in a series between the outputs of said first and second amplifiers, respectively;
driver amplifier having its input connected to the junction between said first and second capacitors;
a transformer having a primary and secondary winding, said primary winding connected to the output of said driver amplifier; and
semiconductor switch means having a gate terminal and two circuit terminals, said gate terminal being connected to said transformer secondary winding, one of said circuit terminals being connected to said radiant energy heater means and the other of said circuit terminals being adapted to receive a source of alternating circuit power.

9. The radiant energy heating apparatus described in claim 8 wherein said audio and visual alarms include:

a relaxation oscillator circuit connected to said driver means output;
a speaker connected to said relaxation oscillator for converting the electrical oscillations thereof into an audible tone;
a free running multivibrator circuit connected to said driver means output; and
a lamp connected to said multivibrator circuit, said lamp flashing on and off in response to the electrical oscillations of said multivibrator.

10. A radiant energy heating apparatus for heating living subjects comprising:
a control enclosure having a plurality of pre-focussed lamps with infrared filters and an electronic control unit for controlling the electrical power delivered to said lamps;
an adjustable cantilever arm attached to said control enclosure;
a supporting post into which said cantilever arm is adjustably inserted;
a base cabinet attached to said supporting post;
a platform having wheels thereon to which said base cabinet is attached;
support members attached to said base cabinet;
a basinet adjustably attached to said support members for holding a living subject the temperature of which is to be controlled; and
a temperature sensor attached to said living subject and connected to said electronic control unit for controlling the electrical power delivered to said lamps whereby the infrared energy radiating therefrom heats said living subject.

* * * * *